(12) United States Patent
Keyser et al.

(10) Patent No.: US 9,902,296 B2
(45) Date of Patent: Feb. 27, 2018

(54) SEATBACK DRIVE SYSTEM SPRING DOWN, POWER UP

(71) Applicant: LEAR CORPORATION, Southfield, MI (US)

(72) Inventors: Mark R. Keyser, Lake Orion, MI (US); Curtis Hudson, Macomb, MI (US)

(73) Assignee: LEAR CORPORATION, Southfield, MI (US)

( * ) Notice: Subject to any disclaimer, the term of this patent is extended or adjusted under 35 U.S.C. 154(b) by 2 days.

(21) Appl. No.: 15/164,443

(22) Filed: May 25, 2016

(65) Prior Publication Data

US 2017/0341538 A1  Nov. 30, 2017

(51) Int. Cl.
*B60N 2/22* (2006.01)
*B60N 2/20* (2006.01)

(52) U.S. Cl.
CPC ............. *B60N 2/2213* (2013.01); *B60N 2/20* (2013.01)

(58) Field of Classification Search
CPC ................................ B60N 2/2213; B60N 2/20
See application file for complete search history.

(56) References Cited

U.S. PATENT DOCUMENTS

| | | | |
|---|---|---|---|
| 4,538,856 A * | 9/1985 | Katsumoto | B60N 2/2213 16/333 |
| 4,930,841 A | 6/1990 | Wittig | |
| 6,543,850 B1 | 4/2003 | Becker et al. | |
| 6,573,673 B1 | 6/2003 | Hampel et al. | |
| 7,066,543 B2 * | 6/2006 | Yu | B60N 2/0232 297/362 |
| 7,235,030 B2 | 6/2007 | Becker et al. | |
| 7,775,594 B2 * | 8/2010 | Bruck | B60N 2/0232 297/362 |
| 8,408,628 B2 * | 4/2013 | Yamazaki | B60N 2/3011 296/65.05 |
| 8,974,000 B2 | 3/2015 | Navatte et al. | |
| 2008/0150312 A1 | 6/2008 | Lehr et al. | |

* cited by examiner

*Primary Examiner* — Philip F Gabler
(74) *Attorney, Agent, or Firm* — Brooks Kushman P.C.

(57) ABSTRACT

A seatback drive assembly includes a lower bracket, a seatback pivotally mounted to the lower bracket, and a lock cam pivotally mounted to the seatback. The lock cam holds the seatback in an upright position when the lock cam engages the lower bracket. A biasing spring moves the seatback to a folded position when the lock cam is disengaged from the lower bracket. The seatback drive assembly also includes a gear pivotally mounted to the lower bracket and having a set of gear teeth. A motorized pinion engages the gear and is driven by an electric motor.

20 Claims, 5 Drawing Sheets

SEATBACK DRIVE SYSTEM SPRING DOWN, POWER UP

TECHNICAL FIELD

In at least one aspect, the present invention is related to methods and systems for lowering a seatback.

BACKGROUND

Successful automotive vehicle design requires consideration of numerous diverse design objectives. Components comprising the automobile must often meet criteria ranging from strength and durability to style and comfort. Moreover, increased functionality combined with ease of installation are also important vehicle design characteristics.

The prior art teaches an automotive seat that includes a seat cushion, and a backrest pivotally mounted to the seat cushion so that the backrest may be reclined at a selected angle relative to the seat cushion for comfort. To improve seat comfort, a headrest is often defined on the upper portion of the backrest, for example, by supporting a cushion atop the backrest using a pair of posts that are slidably received in complementary guides defined in the upper portion of the backrest frame. In some vehicle seat designs, a separate release actuator is deployed to allow the seatback to be positioned in the folded position. In such a design, a vehicle occupant can induce the seatback to be positioned in intermediate positions between the design upright position and the folded position. In rear seat applications, space is at a premium making intermediate positioning undesirable.

Accordingly, there is a need for improved seatback designs with improved mechanism for folding and raising the seatback.

SUMMARY

The present invention solves one or more problems of the prior art by providing a seatback drive assembly having spring down, power up functionality. The seatback drive assembly includes a lower bracket, a seatback frame pivotally mounted to the lower bracket, and a lock cam pivotally mounted to the seatback. The lock cam holding the seatback frame in an upright position when the lock cam engages the lower bracket. A biasing spring moves the seatback frame to a folded position when the lock cam is disengaged from the lower bracket. The seatback drive assembly also includes a gear. The gear is pivotally mounted to the lower bracket. The gear has a set of gear teeth, a first actuating member, and a second actuating member. The seatback drive assembly also includes a motorized pinion having peripheral teeth that engages the set of gear teeth. Characteristically, the motorized pinion positions the seatback frame in the folded position by rotation about a first direction such that the first actuating member contacts the lock cam causing the lock cam to pivot and disengage the lower bracket thereby initiating the seatback frame to move to the folded position. Similarly, the motorized pinion positions the seatback frame in the upright position by rotating in a second direction such that the second actuating member contacts the seatback frame causing the seatback frame to pivot to the upright position.

In another embodiment, a seatback drive assembly is provided. The seatback frame assembly includes a lower bracket having a first bracket side and a second bracket side, a seatback frame pivotally mounted to the first bracket side, a seat bottom frame pivotally mounted to the seat back frame, and a lock cam pivotally mounted to the seatback frame. The lock cam holds the seatback frame in an upright position when the lock cam engages the lower bracket. A biasing spring moves the seat bottom frame forward such that the seatback frame moves to a folded position when the lock cam is disengaged from the lower bracket. A sector gear having a first gear side and a second gear side. The sector gear is pivotally mounted to the lower bracket at the second bracket side. The sector gear includes a set of gear teeth along a portion of an outer, a first pin, and a second pin. The first pin and the second pin extend from the first gear side. The seatback drive assembly also includes a pinion having peripheral teeth that engages the set of gear teeth and an electric motor that rotates the pinion. Characteristically, the pinion positions the seatback frame in the folded position by rotation of the pinion about a first direction which causes the sector gear to move in an opposite direction to the first direction such that the first pin contacts the lock cam causing the lock cam to pivot and disengage the lower bracket thereby initiating the seatback frame to move to the folded position. Similarly, the pinion positions the seatback frame in the upright position by rotation of the pinion in a second direction which causes the sector gear to rotate in an opposite direction to the second direction such that the second pin contacts the seatback frame causing the seatback frame to pivot to the upright position.

Advantageously, the seatback drive assemblies can be positioned in second and third row rear with fast load floor cargo and a power up configuration. The seatback drive assembly set forth herein allows the seatback to spring forward and down into cargo position. The motor release of the embodiments herein unlocks without a separate release actuator.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
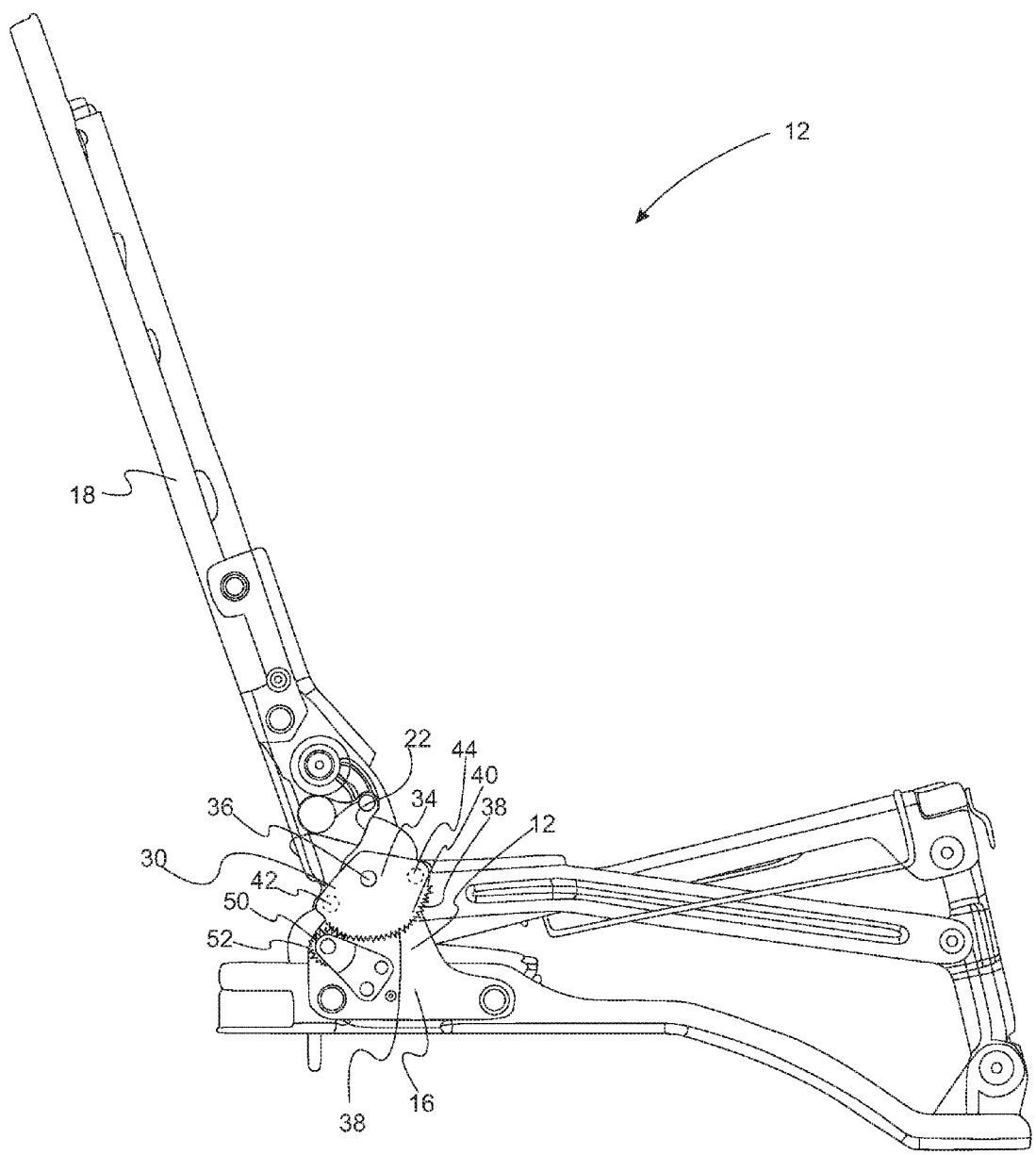
FIG. 1 is a side view of the seatback drive assembly having spring down, power up functionality.
Figure 2:
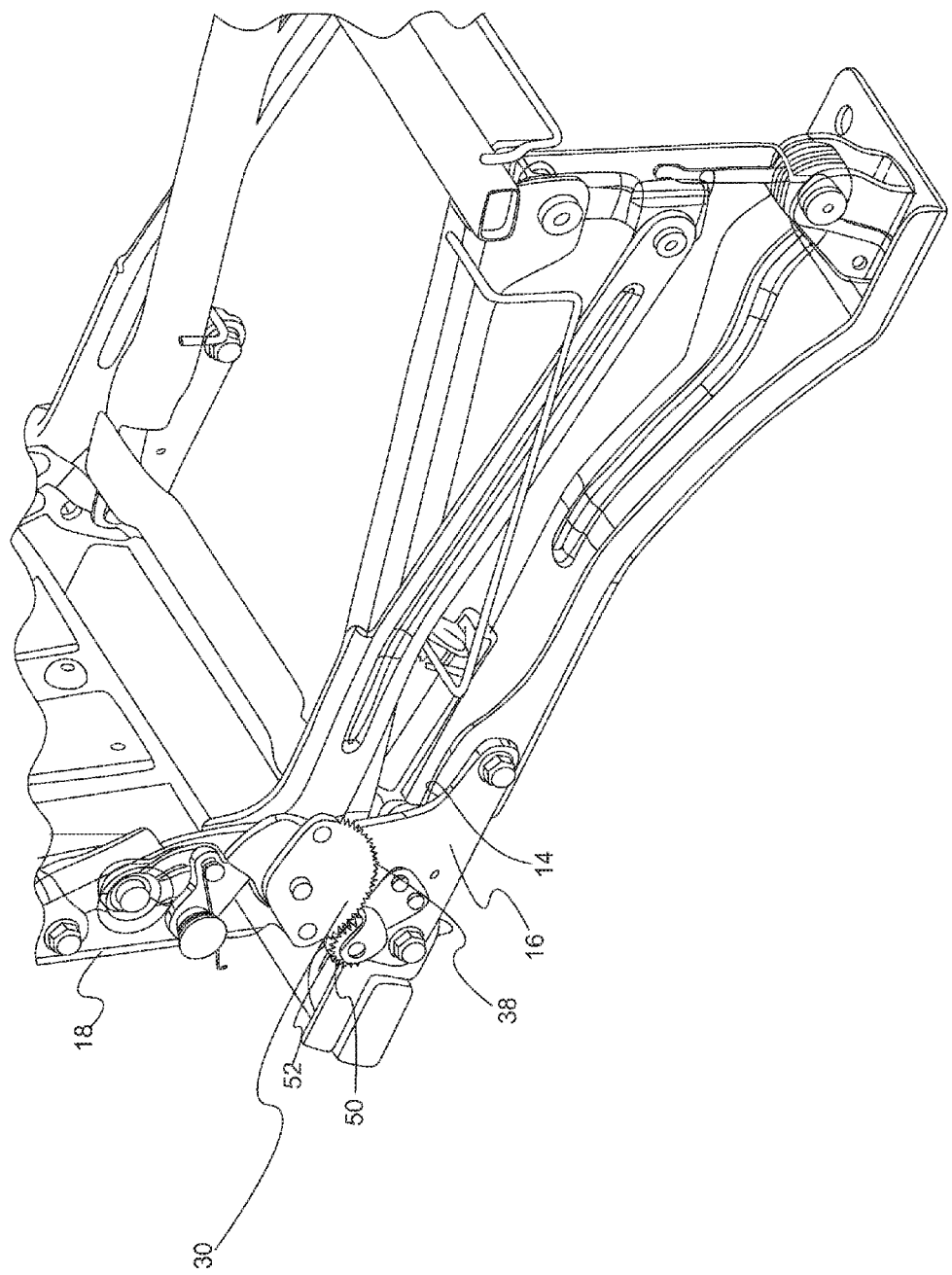
FIG. 2 provide perspective views of the seatback drive assembly having spring down, power up functionality.
Figure 3:
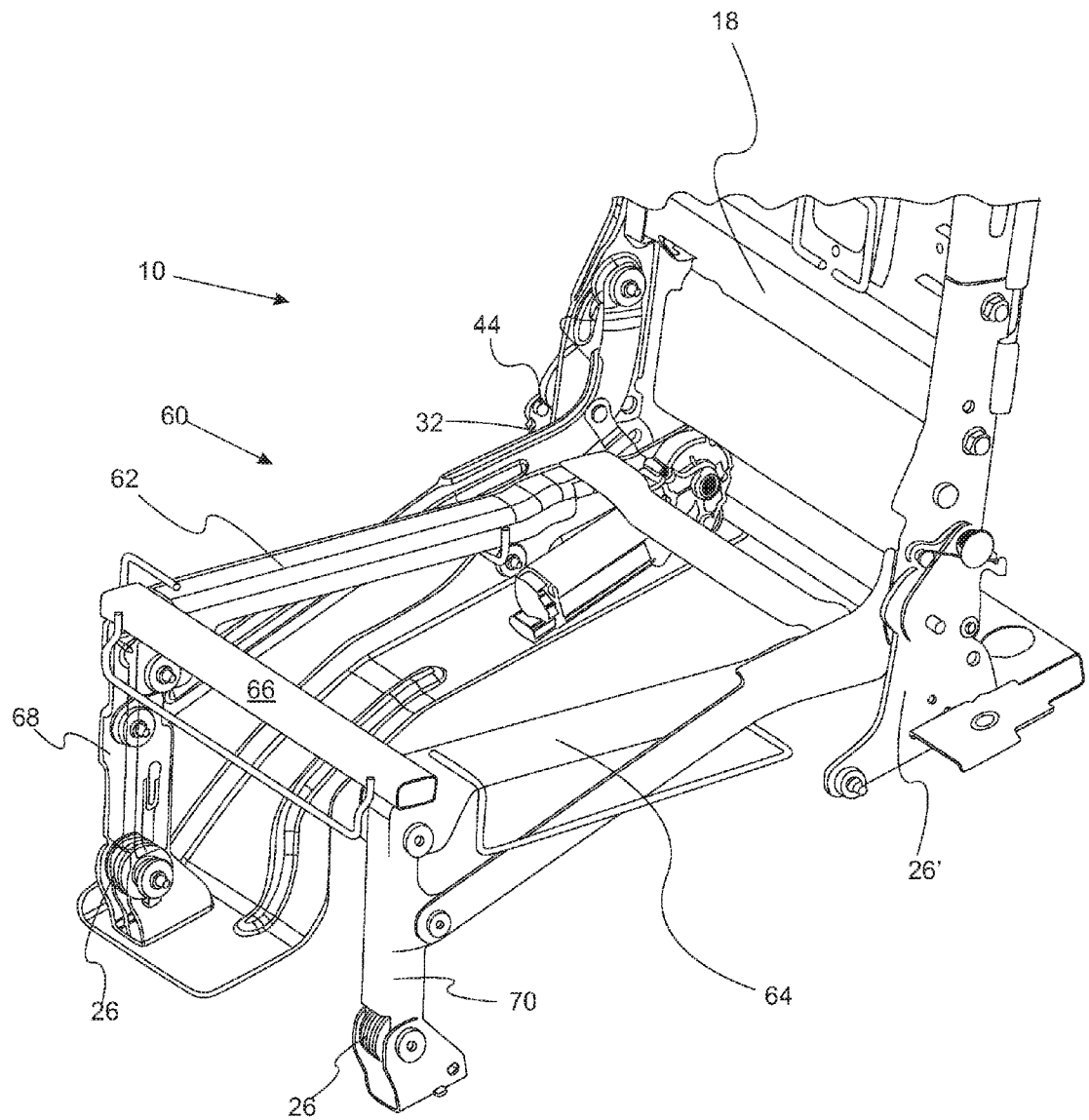
FIG. 3 provide perspective views of the seatback drive assembly having spring down, power up functionality.

With reference to FIGS. 1, 2, and 3, a seatback drive assembly with spring down, power up functionality is schematically illustrated. FIG. 1 is a side view of the seatback drive assembly. FIGS. 2 and 3 provide perspective views of the seatback drive assembly. Seatback drive system 10 includes lower bracket 12 having a first bracket side 14 and a second bracket side 16. Seatback frame 18 is pivotally mounted to the first bracket side 14. A lock member (e.g., lock cam 20) is pivotally mounted to the seatback frame 18. Lock cam 20 is formed from a flat metal plate and pivots about pivot rod 22. Lock cam 20 holds the seatback frame 18 in an upright position when the lock cam engages the lower bracket 12 at stop edge 22 of the lower bracket. Biasing spring 26 act to move the seatback frame 18 to a folded position when the lock cam 20 is disengaged from the lower bracket 12. Seatback drive system 10 also includes sector gear 30 which has a first gear side 32 and a second gear side 34.

Sector gear 30 is pivotally mounted to the lower bracket 12 via pivot rod 36 at the second bracket side 16 about pivot rod 36. First gear side 32 faces second bracket side 16. Sector gear 30 has a set of gear teeth 38 along a portion of outer edge 40. Sector gear 30 includes a first actuating member 42, such as a projection or pin extending from sector gear 30 and a second actuating member 44, such as a projection or pin extending from sector gear 30. First pin 42 and a second pin 44 extends from the first gear side 32. In a refinement, first pin 42 is positioned near a first end of the set of gear teeth and second pin 44 is positioned near a second end of the set of gear teeth. Typically, first pin 42 and second pin 44 are offset from pivot point. The separation between first pin 42 and second pin 44 may be 0.5 to 3 inches. Pinion 50 has peripheral teeth 52 that engage the set of gear teeth 38. Therefore, rotation of pinion 50 induces opposite rotation of sector gear 30.

Still referring to FIGS. 1, 2, and 3, seat bottom frame 60 is also pivotally attached to seatback frame 18. Seat bottom frame 60 includes frame arms 62, 64 extend outwardly from the attachment region to brackets 26, 26'. Cross member 66 attached ends of frame arms 62, 64 together. Collectively, frame arms 62, 64 and cross member 66 form the seat bottom frame region over which cushioning is placed and a vehicle occupant will sit. Legs 68, 70 are pivotally connected to the ends of frame arms 62, 64. The bottoms of legs 68, 70 are attached to the floor of a vehicle.

Still referring to FIGS. 1, 2, and 3, seatback frame assembly is depicted as having a pair of biasing springs 26. When the lock cam 20 is disengaged from the lower bracket 12, biasing spring(s) 26 act to pull the seat bottom forward and down thereby causing seatback frame 18 and legs 68, 70 to pivot to the folded position. Electric motor 72 is attached beneath seat bottom frame 60 in the vicinity of lower bracket 12. A motor driven rod extends from electric motor 72 through an opening in lower bracket 12. Pinion 50 is attached to the end of the motor driven rod such that pinion 50 can be driven in a clockwise or counter clockwise direction to raise or lower seatback frame 18 as specified by as user (e.g., a vehicle occupant).

Figure 4A:
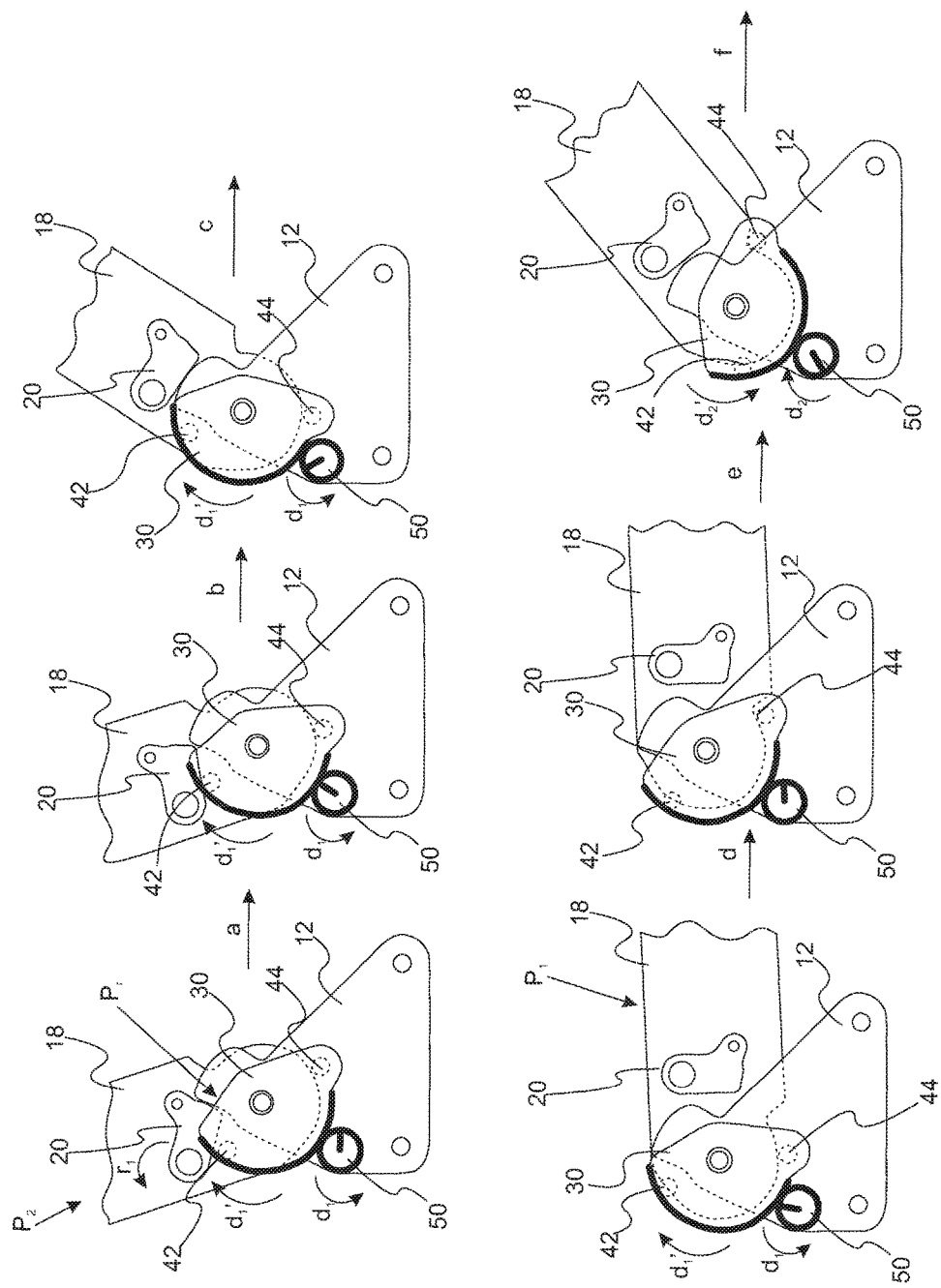
FIG. 4A is a schematic flowchart showing a seatback drive assembly having spring down, power up functionality.
Figure 4B:
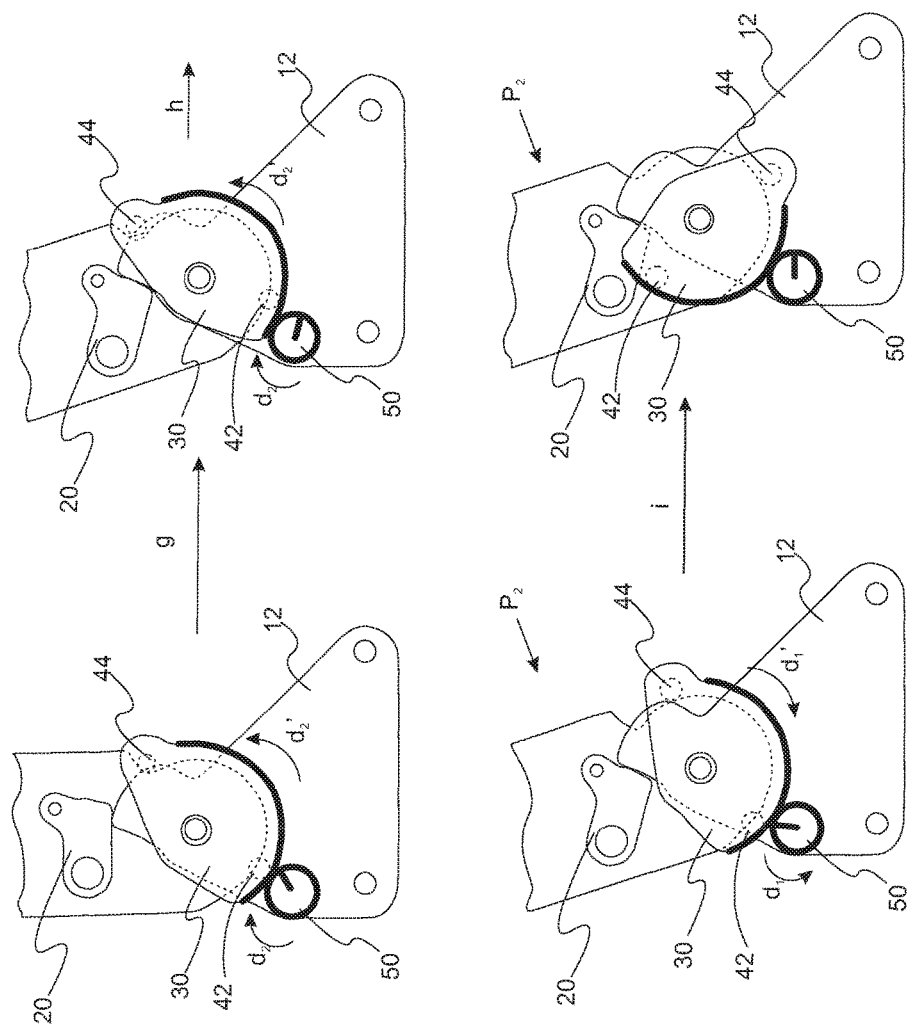
FIG. 4B is a continuation of FIG. 4A.

With reference to FIGS. 4A-B, the operation of the seatback drive assembly is schematically illustrated. Initially, sector gear 30 is positioned at a ready position Pr when the seatback is positioned in the design position (i.e., upright position). When at this position, first pin 42 may be at a distance from 0 to 3 inches from lock cam 20. Moreover, if first pin 42 contacts lock cam 20, it does not exert sufficient pressure to disengage lock cam 20 from lower bracket 12. Steps a) through d) depict the scenario of a user initiating positioning of seatback frame 18 to the folded position (e.g., by actuating a switch). In this scenario, pinion 50 rotates about a first direction $d_1$ which causes sector gear 30 to rotate in opposite direction $d_1'$. First direction $d_1$ is opposite to direction $d_1'$ in the clockwise/counterclockwise sense, i.e., if $d_1$ is clockwise direction $d_1'$ is counterclockwise and vice versa. During rotation in direction $d_1'$, the first pin 42 contacts the lock cam 20 causing the lock cam to pivot about direction $r_1$ and disengage the lower bracket 12 as shown is steps a) and b). This disengagement initiates seatback 18 to move to the folded position $P_1$ due the force provided by biasing spring 26 (i.e., spring down) as depicted in steps c) and d).

Still referent to FIGS. 4A-B, steps e) through i) depict the scenario of a user initiating positioning of seatback frame 18 to the folded position (e.g., by actuating a switch). In this scenario, pinion 50 rotates about a second direction $d_2$ which is opposite of the opposite sense to direction $d_1$ in the clockwise/counterclockwise sense as depicted in steps e) and f). For example, if direction $d_1$ is clockwise direction $d_2$ will be counter clockwise or if direction $d_1$ is counter clockwise direction $d_2$ will be clockwise and vice versa. The motion of pinion 50 about direction $d_2$ causes sector gear 30 to pivot in opposite direction $d_2'$ in the clockwise/counterclockwise sense. For example, if direction $d_1$ is clockwise direction $d_2$ will be counter clockwise or if direction $d_1$ is counter clockwise direction $d_2$ will be clockwise and vice versa. During this pivoting of sector gear 30, second pin 44 contacts and pushes seatback frame 18 to the upright position $P_2$ as shown in steps g) and h). In step i), pinion 50 continues to rotate along direction $d_2$ and sector gear 30 along opposite direction $d_2'$ until sector gear 30 is positioned at a ready position Pr.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments and variations may be combined to form further embodiments of the invention.

What is claimed is:

1. A seatback drive assembly comprising:
   a lower bracket having a first bracket side and a second bracket side;
   a seatback frame pivotally mounted to the first bracket side the lower bracket;
   a lock member pivotally mounted to the seatback frame, the lock member holding the seatback frame in an upright position when the lock member engages the lower bracket;
   a biasing spring that moves the seatback frame to a folded position when the lock member is disengaged from the lower bracket;

a sector gear pivotally mounted to the lower bracket, the sector gear having a first gear side, a second gear side, a set of gear teeth positioned along a portion of an outer edge of the sector gear, a first pin, and a second pin, the first pin and the second pin extending from the first gear side, the sector gear being mounted to the lower bracket at the second bracket side; and a pinion having peripheral teeth that engage the set of gear teeth, the pinion positioning the seatback frame in the folded position by rotation about a first direction such that the first pin contacts the lock member causing the lock member to pivot and disengage the lower bracket thereby initiating the seatback frame to move to the folded position, the pinion positioning the seatback frame in the upright position by rotating in a second direction such that the second pin contacts the seatback frame causing the seatback frame to pivot to the upright position.

2. The seatback drive assembly of claim 1, wherein the lock member is a lock cam.

3. The seatback drive assembly of claim 2 wherein the first pin is at a distance from 0 to 3 inches from the lock cam when the seatback frame is positioned in the upright position.

4. The seatback drive assembly of claim 1 further comprising an electric motor that rotates the pinion.

5. The seatback drive assembly of claim 1 further comprising a seat bottom frame that is biased by the biasing spring such that the seatback frame moves to the folded position by force applied from the biasing spring.

6. The seatback drive assembly of claim 1 wherein the first direction is opposite to the second direction in a clockwise/counter clockwise sense.

7. The seatback drive assembly of claim 1 wherein the first pin is positioned proximate to a first end of the set of gear teeth and the second pin is positioned near a second end of the set of gear teeth.

8. The seatback drive assembly of claim 1 wherein the sector gear is positioned at a ready position when the seatback frame is positioned in the upright position.

9. The seatback drive assembly of claim 1 wherein when the seatback frame is to be positioned in the folded position, rotation of the pinion causes the sector gear to move is a direction that is opposite to the first direction in a clockwise/counter clockwise sense.

10. The seatback drive assembly of claim 9 wherein the first pin contacts the lock cam lock member causing the lock cam lock member to pivot and disengage the lower bracket.

11. The seatback drive assembly of claim 10 wherein after the lock member disengages the lower bracket, the seatback frame moves to the folded position due to a force provided by the biasing spring.

12. The seatback drive assembly of claim 9 wherein when the seatback frame is to be positioned in the upright position, rotation of the pinion causes the sector gear to move in a direction that is opposite to the second direction in a clockwise/counter clockwise sense.

13. The seatback drive assembly of claim 12 wherein when the seatback frame is to be positioned in the upright position from the folded position, the pinion rotates about a second direction which is opposite to the first direction in a clockwise/counterclockwise sense.

14. The seatback drive assembly of claim 12 wherein rotation of the pinion about the second direction causes the sector gear to rotate in an opposite direction in a clockwise/counterclockwise sense such that the second pin contacts and pushes the seatback frame to the upright position.

15. The seatback drive assembly of claim 14 wherein the pinion continues to rotate along the second direction until the sector gear is positioned at a ready position.

16. A seatback drive assembly comprising:
a lower bracket having a first bracket side and a second bracket side;
a seatback frame pivotally mounted to the first bracket side;
a seat bottom frame pivotally mounted to the lower bracket;
a lock cam pivotally mounted to the seatback frame, the lock cam holding the seatback frame in an upright position when the lock cam engages the lower bracket;
a biasing spring that moves the seat bottom frame forward such that the seatback frame moves to a folded position when the lock cam is disengaged from the lower bracket;
a sector gear having a first gear side and a second gear side, the sector gear being pivotally mounted to the lower bracket at the second bracket side, the sector gear having a set of gear teeth along a portion of an outer edge, a first pin, and a second pin, the first pin and the second pin extending from the first gear side; and
a pinion having peripheral teeth that engages the set of gear teeth; and
an electric motor that rotates the pinion, the pinion positioning the seatback frame in the folded position by rotation of the pinion about a first direction which causes the sector gear to move in an opposite direction to the first direction such that the first pin contacts the lock cam causing the lock cam to pivot and disengage the lower bracket thereby initiating the seatback frame to move to the folded position, the pinion positioning the seatback frame in the upright position by rotation of the pinion in a second direction which causes the sector gear to rotate in an opposite direction to the second direction such that the second pin contacts the seatback frame causing the seatback frame to pivot to the upright position.

17. The seatback drive assembly of claim 16 wherein the first pin is positioned proximate to a first end of the set of gear teeth and the second pin is positioned near a second end of the set of gear teeth.

18. The seatback drive assembly of claim 16 wherein the sector gear is positioned at a ready position when the seatback frame is positioned in the upright position.

19. The seatback drive assembly of claim 16 wherein when the pinion is rotating in the first direction, the first pin contacts the lock cam causing the lock cam to pivot and disengage the lower bracket thereby causing the seatback frame to move to the folded position due to a force provided by the biasing spring.

20. The seatback drive assembly of claim 16 wherein rotation of the pinion about the second direction causes the second pin to contact and push the seatback frame to the upright position.

* * * * *

UNITED STATES PATENT AND TRADEMARK OFFICE
CERTIFICATE OF CORRECTION

Page 1 of 1

PATENT NO. : 9,902,296 B2
APPLICATION NO. : 15/164443
DATED : February 27, 2018
INVENTOR(S) : Mark R. Keyser et al.

It is certified that error appears in the above-identified patent and that said Letters Patent is hereby corrected as shown below:

In the Claims

Column 4, Line 60, Claim 1:
After "the first bracket side"
Insert -- and --.

Signed and Sealed this
Nineteenth Day of June, 2018

Andrei Iancu
*Director of the United States Patent and Trademark Office*